US011620106B1

(12) United States Patent
Powell

(10) Patent No.: US 11,620,106 B1
(45) Date of Patent: Apr. 4, 2023

(54) PARALLEL HYBRID ADDER

(71) Applicant: The United States of America as represented by the Secretary of the Navy, Newport, RI (US)

(72) Inventor: Makia S Powell, North Dighton, MA (US)

(73) Assignee: The United States of America as represented by the Secretary of the Navy

( * ) Notice: Subject to any disclaimer, the term of this patent is extended or adjusted under 35 U.S.C. 154(b) by 253 days.

(21) Appl. No.: 17/123,194

(22) Filed: Dec. 16, 2020

(51) Int. Cl.
*G06F 7/501* (2006.01)
*G06F 7/505* (2006.01)

(52) U.S. Cl.
CPC ............ *G06F 7/501* (2013.01); *G06F 7/5055* (2013.01)

(58) Field of Classification Search
CPC .......... G06F 7/50; G06F 7/501; G06F 7/5055; G06F 7/506–508; G06F 2207/5063
See application file for complete search history.

(56) References Cited

U.S. PATENT DOCUMENTS

| | | | | |
|---|---|---|---|---|
| 5,198,993 A * | 3/1993 | Makakura | G06F 7/507 | 708/672 |
| 5,898,596 A * | 4/1999 | Ruetz | G06F 7/508 | 708/705 |
| 6,832,235 B1 * | 12/2004 | Muramatsu | G06F 7/508 | 708/710 |
| 9,292,474 B1 * | 3/2016 | Pistorius | G06F 7/508 | |
| 2002/0091744 A1 * | 7/2002 | Kantabutra | G06F 7/508 | 708/712 |
| 2008/0046498 A1 * | 2/2008 | Haller | G06F 7/507 | 708/700 |
| 2019/0042194 A1 * | 2/2019 | Langhammer | G06F 7/505 | |

* cited by examiner

*Primary Examiner* — Matthew D Sandifer
*Assistant Examiner* — Huy Duong
(74) *Attorney, Agent, or Firm* — James M. Kasischke; Michael P. Stanley

(57) ABSTRACT

A combined adder for N logical bits to produce a sum from a first addend having N first addend bits and a second addend having N second addend bits. A least significant adder produces a segment sum of the least significant bits and a carry out. Segment adder pairs are used for each higher order of significant sums. One segment adder produces a segment sum portion, and the other produces an incremented segment sum portion. Carry logic associated with each segment is utilized with a multiplexer to select the incremented segment sum portion or the segment sum portion. The selected segment sum portions are assembled with a most significant carry out to produce the sum.

6 Claims, 3 Drawing Sheets

20'
ADDER
INC
MUX
CARRY LOGIC

PARALLEL HYBRID ADDER

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to a adder for digital circuitry. More particularly the invention is directed toward an efficient, multistage adder.

(2) Description of the Prior Art

Kogge-Stone addition is different from traditional ripple-carry based addition since it computes the sum all at once in parallel versus waiting for a carry to propagate from right to left. Traditionally, the problem with addition is waiting for the carry to propagate from the least significant bit, to the most significant bit of the answer. This is because the sum is actually computed digit-by-digit, or in the case of binary, bit-by-bit from right to left. This is actually the same way that addition is done by hand.

For example, in base 10 to compute 21+19, 1+9 is first computed, which leaves 0 with a carry of 1. In the next stage, 2 and 1 are added which yields 3. The carry out of the previous stage is added which yields 3+1=4. Writing the results of each stage from most-significant to least significant digit, results in 40. The same is true for binary based addition, in order to compute X, where X=A+B, one would need to wait for the carry out to propagate from the least significant bits of A+B to the most significant bits of A+B.

FIG. 1 is a diagram of a prior art combination of ripple carry adders that is being used to make an N-bit adder 10. First addend A has N bits with each bit denoted as n. Second addend B has N bits with each bit denoted as n. By combining a number M of smaller adders $\mathbf{12}_0$, $\mathbf{12}_{M-1}$, and $\mathbf{12}_M$, it is possible to compute an N-bit adder having as many bits as desired. First addend A is separated into segments of bits $A_0, \ldots, A_{M-1}, A_M$. Each segment should have the same number of bits as the corresponding smaller adder $\mathbf{12}_m$. Likewise, addend B is separated into segments of bits $B_0, \ldots B_{M-1}, B_M$ with each segment having the same number of bits as the corresponding segment adder $\mathbf{12}_m$. Each adder $\mathbf{12}_m$ produces a partial sum result $X_m$ and a carry $CX_m$. Carry $CX_m$ is one bit. Carry $CX_m$ is provided to the next higher order adder $\mathbf{12}_{m+1}$ as a carry in. The lowest order adder $\mathbf{12}_0$ can be a half adder because it does not receive a carry in. Highest order adder $\mathbf{12}_M$ produces the most significant bit for the adder $CX_M$. The final sum S is the combination of $CX_M$, $X_M$, $X_{M-1}, \ldots X_0$.

In order to compute S=A+B, obtaining a result must wait for the carry out of the least significant adder to make it to the most significant segment adder. This means that the most significant segment adder cannot compute until M−1 full adder delays after A and B are entered into the combined adder. The more bits and adder segments, the more stages and more resulting area, power and delays within the adder.

The Kogge-Stone adder eliminates this delay by passing the carry out bits to all stages. Since all of the carry out bits are available in all stages, the result can be computed in parallel. This parallel computation requires dedicated carry propagation hardware connected to each bit of the answer. Each stage in the Kogge-Stone adder is one bit wide resulting in 32 stages for a 32-bit adder. Dedicated carry propagate logic is connected to all 32 stages. Since each stage is made of basic AND and XOR logic gates, is very interconnected with the dedicated carry propagation logic. Implementation of the Kogge-Stone adder causes a great increase in area and loss of performance due to the increase in routing between the logical elements, and a greater number of required logical elements.

U.S. Pat. No. 5,701,504 to Timko teaches an "Apparatus and Method for Addition Based Upon Kogge-Stone Parallel Algorithm." This uses the traditional Kogge-Stone Addition method which has the same number of stages as an adder having the same number of bits. The embodiment is particularly tailored for CMOS integrated circuits. The carry propagation routing necessary to make the carry of one stage available to all stages creates a larger area, slower speed, and increased power when applied to programmable logic solid state devices such as field programmable gate arrays (FPGAs). For many different size adders (up to 64 bits), Kogge-Stone adders are actually one half as fast as ripple carry adders when implemented on FPGAs.

There is thus a need to provide a digital adder that operates more efficiently than current digital adder designs when applied in programmable logic devices.

SUMMARY OF THE INVENTION

It is a first object to provide an adder utilizing fewer computational cycles.

Another object is to provide an adder particularly adapted for implementation with field programmable gate arrays.

Accordingly, there is provided a combined adder for N logical bits to produce a sum from a first addend having N first addend bits and a second addend having N second addend bits. A least significant adder produces a segment sum of the least significant bits and a carry out. Segment adder pairs are used for each higher order of significant sums. One segment adder produces a segment sum portion, and the other produces an incremented segment sum portion. Carry logic associated with each segment is utilized with a multiplexer to select the incremented segment sum portion or the segment sum portion. The selected segment sum portions are assembled with a most significant carry out to produce the sum.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 2:
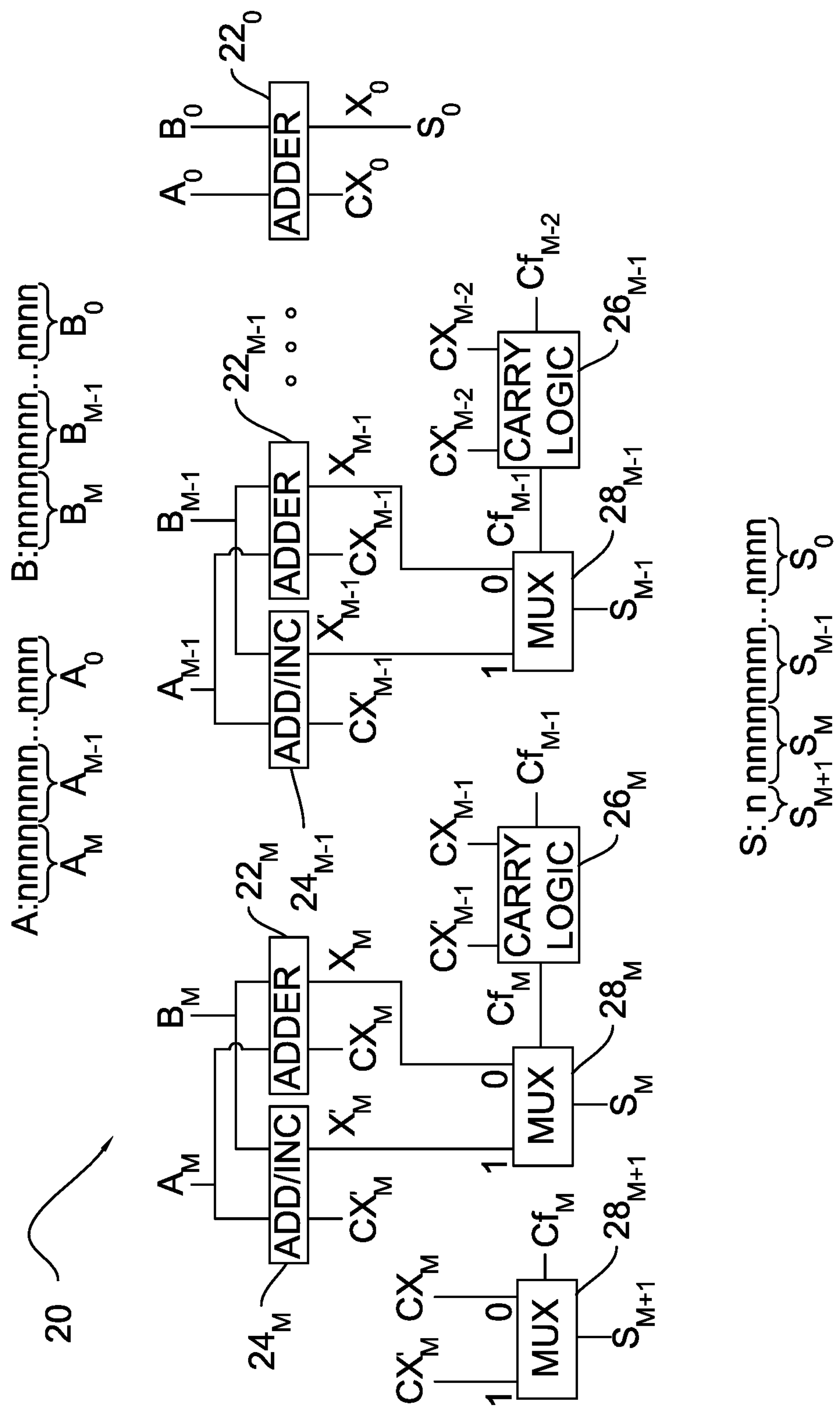
FIG. 2 is a diagram of an adder according to a first embodiment.

In FIG. 2 there is shown an adder embodiment 20 that is tailored for use in programmable logic components such as field programmable gate arrays. This adder 20 provides a hybrid between ripple-carry adder logic and carry look-ahead logic. As in the prior art, adder 20 provides the sum S when a first addend A is added to a second addend B. First addend and second addend are N bits wide. Each individual bit is shown as n. Each addend is separated groups of adjacent bits or segments for provision to segmented adders $\mathbf{22}_0, \ldots, \mathbf{22}_{M-1}$, and $\mathbf{22}_M$ and to segmented incremented adders $\mathbf{24}_0, \ldots, \mathbf{24}_{M-1}$, and $\mathbf{24}_M$. The segments m can be different bit widths, but they should have the same width as the associated segment adder $\mathbf{22}_m$ and incremented segment adder $\mathbf{24}_m$.

Each segmented adder $\mathbf{22}_m$ produces a segmented sum portion $X_m$ and a segment carry out $CX_m$. Likewise, each segmented incremented adder $\mathbf{24}_m$ produces an incremented segmented sum portion $X'_m$ and an incremented segment carry out $CX'_m$. Segmented sum portion $X_m$ and incremented segmented sum portion $X'_m$ are the K−1 least significant bits of a segmented adder having K bits. $CX_m$ and $CX'_m$ are the most significant bits. The incremented segmented sum portion $X'_m$ is equal to the segmented sum portion $X_m$ plus 1. The incremented segment carry out $CX'_m$ reflects any carry that results from adding 1 to the segmented sum portion $X_m$. Thus, the output of the segment adder 22*m* is the segmented sum portion if no carry is received from the lower order segment m−1, and the incremented segment adder 24*m* output is the segmented sum portion if a carry in is received from the lower order segment m−1. There is no incremented segment adder for the lowest segment m=0 because this segment doesn't receive a carry in.

Carry logic $\mathbf{26}_m$ is associated with segments 1 to m to select either the segmented sum portion $X_m$ or the incremented segmented sum portion $X'_m$ as the final segmented sum portion $S_m$. For this purpose, segmented sum portion $X_m$ and incremented segmented sum portion $X'_m$ are provided to a segment multiplexer $\mathbf{28}_m$. In the embodiment shown, segment multiplexer $\mathbf{28}_m$ provides incremented segmented sum portion $X'_m$ as the final segment sum portion $S_m$ if carry logic $\mathbf{26}_m$ provides a 1 as the segment carry factor $Cf_m$. If carry logic 26*m* provides a 0 as the segment carry factor $Cf_m$, the final segment sum portion $S_m$ is the segmented sum portion $X_m$. Carry logic $\mathbf{26}_m$ is shown in further detail in FIG. 3.

Figure 1:
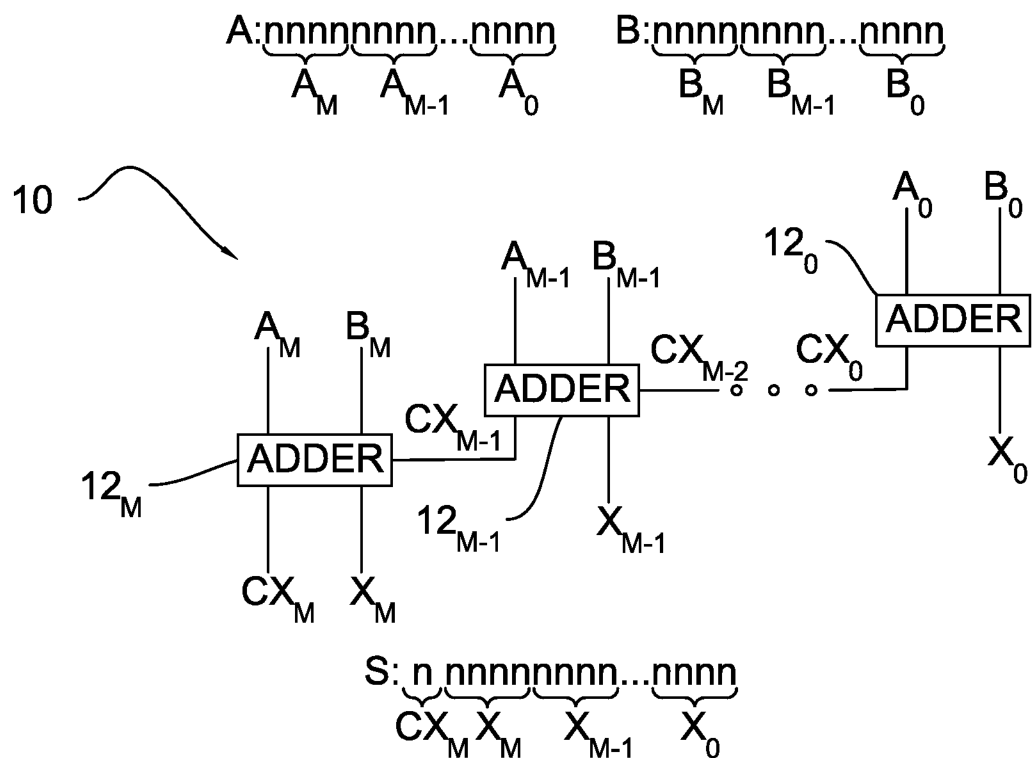
FIG. 1 is diagram of a prior art ripple carry adder.
Figure 3:
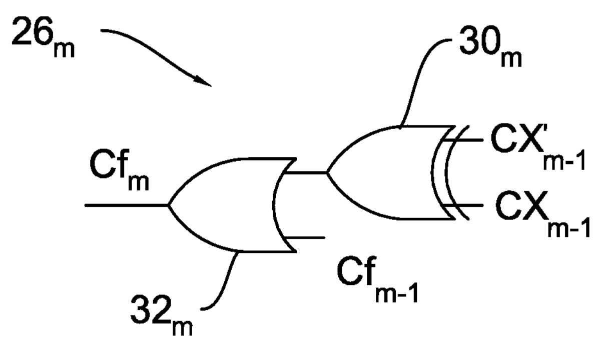
FIG. 3 is a detail of carry logic utilized in the adder of FIGS. 2 and 4.

As detailed in FIG. 3, carry logic 26*m* receives a segment carry out $CX_{m-1}$ and an incremented segment carry out, $CX'_{m-1}$ from the previous, lower order segment m−1 at an XOR component 30*w*. XOR component $\mathbf{30}_m$ output along with the previous segment carry factor $Cf_{m-1}$ are provided to an OR component $\mathbf{32}_m$. An OR logical function is performed on these components to give the current segment carry factor $Cf_m$. Referring back to FIG. 2, current segment carry factor $Cf_m$ is used by multiplexer $\mathbf{28}_m$ to select the segmented sum portion $X_m$ or the incremented segmented sum portion $X'_m$ as the final segment sum portion $S_m$.

For the segment where M=1, the carry factor for segment 0, $Cf_0$, equals the segment carry out, $CX_0$ because the XOR between segment carry out and the incremented segment carry out, if computed, is always 1. No carry logic is necessary for this segment.

A final segment carry logic $\mathbf{26}_M$ is used to select between the final segment carry out $CX_M$ and the final incremented segment carry out $CX'_M$ in multiplexer $\mathbf{28}_{M+1}$. Selected final segment carry out is assembled with final segment sum portions $S_0, \ldots, S_{M-1}$, and $S_M$ to give the sum S as shown.

Figure 4:
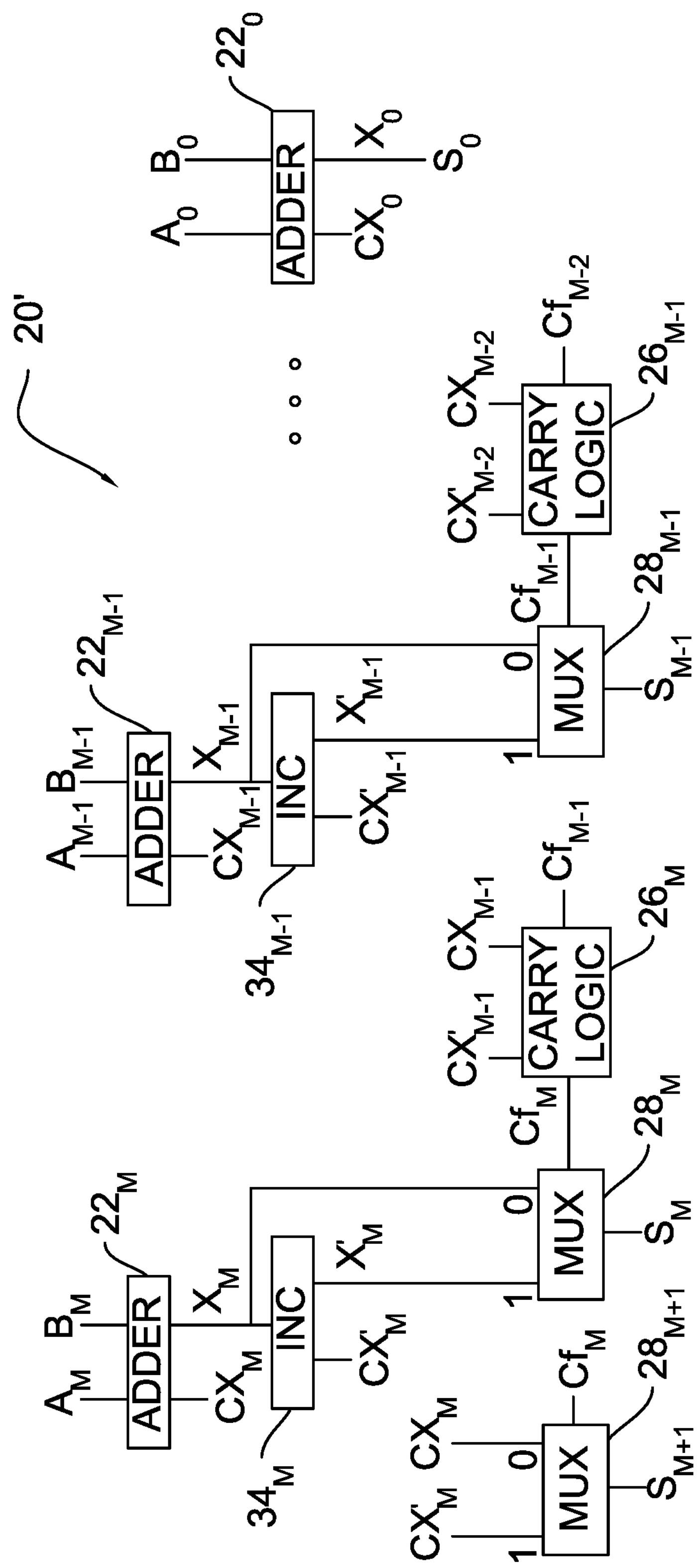
FIG. 4 is a diagram of an adder according to a second embodiment.

FIG. 4 shows an alternate embodiment. This embodiment is generally suboptimal because it introduces an additional computation cycle. It may be applied to efficiently use FPGA resources. In this embodiment, an incrementer $\mathbf{34}_m$ is joined to each adder $\mathbf{34}_1 \ldots \mathbf{34}_M$. Incrementer 34*m* adds 1 to segmented sum portion $X_m$ to compute incremented segmented sum portion $X'_m$ and the incremented segment carry out $CX'_m$. As in the embodiment shown in FIG. 2, multiplexer $\mathbf{26}_m$ is joined to receive segmented sum portion and incremented segmented sum portion to provide a final segment sum portion $S_m$ based on a carry factor $Cf_m$. Carry factor $Cf_m$ is computed from the carry outs in the previous segment and the previous carry factor as shown in FIG. 3. All other components operate as in the embodiment shown in FIG. 2.

It will be understood that many additional changes in the details, materials, steps and arrangement of parts, which have been herein described and illustrated in order to explain the nature of the invention, may be made by those skilled in the art within the principle and scope of the invention as expressed in the appended claims. For example, the addends can be segmented into different bit lengths in order to best fit the programmable logic configuration. Similarly, as shown in FIG. 4, a two stage adder incrementer configuration can be used. Other configurations and optimizations can also be applied.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. A combined adder for N logical bits to produce a sum from a first addend having N first addend bits and a second addend having N second addend bits comprising:

a least significant adder receiving a least significant segment of the first addend bits and the second addend bits producing a least significant sum portion of the least significant first and second addend bits and a least significant carry bit;

a plurality of segment adder pairs, each segment adder pair receiving a unique segment of the first addend bits and the second addend bits, said plurality of segment adder pairs and said least significant adder receiving all of the N logical bits and being ordered by the significance of the unique segment, a first one of said segment adder pair producing a first sum portion of the first addend bits and the second addend bits and a first carry bit, a second one of said segment adder pair producing a second sum portion of the first addend bits and the second addend bits plus one, and a second carry bit;

a plurality of carry logic components with one carry logic component associated with each segment adder pair and having a segment selector value output, the carry logic component joined to receive the first carry bit, the second carry bit, and the segment selector value from an adjacent lower order segment, wherein each carry logic component comprises:

an XOR gate joined to receive the first carry bit from the adjacent lower order segment and the second carry bit from the adjacent lower order segment to produce a carry check bit; and an OR gate joined to receive the carry check bit for the segment, said OR gate providing a selector value from the carry check bit for the segment and the selector value from the adjacent lower order segment;

a plurality of multiplexers with one multiplexer provided for each segment adder pair, each multiplexer joined to receive the first sum portion and the second sum portion from said segment adder pair, each said multiplexer being further joined to receive the selector value from the carry logic component associated with the segment, said multiplexer providing the first sum portion as a segment sum portion output when the received selector value is not asserted and the second sum portion as the segment sum portion output when the received selector value is asserted; and a sum output joined to receive the least significant sum from said least significant adder and the segment sum portion outputs from the plurality of multiplexers to produce the sum of the first addend and the second addend.

2. The apparatus of claim 1, wherein the first one of said segment adder pair and the second one of said segment adder pair each have a fixed number of bits and the most significant bit of the fixed number of bits is identified as the carry bit and the remaining less significant bits are identified as the segment sum portion.

3. The apparatus of claim 1, wherein each segment adder pair comprises a single adder as the first one of said segment adder pair, and an incrementing adder as the second one of said segment adder pair whereby the incrementing adder produces the second sum portion and second carry out by adding 1 to the first sum portion.

4. The apparatus of claim 1, wherein said plurality of segment adder pairs each receive the same number of logical bits.

5. The apparatus of claim 1, wherein a number of segment adder pairs and a number of logical bits in each segment is apportioned to fit a predetermined field programmable gate array.

6. A combined adder for N logical bits to produce a sum from a first addend having N first addend bits and a second addend having N second addend bits comprising:

a least significant adder receiving a least significant segment of the first addend bits and the second addend bits producing a least significant sum portion of the least significant first and second addend bits and a least significant carry bit;

a plurality of segment adder pairs, each segment adder pair receiving a unique segment of the first addend bits and the second addend bits, said plurality of segment adder pairs and said least significant adder receiving all of the N logical bits and being ordered by the significance of the unique segment, a first one of said segment adder pair producing a first sum portion of the first addend bits and the second addend bits and a first carry bit, a second one of said segment adder pair producing a second sum portion of the first addend bits and the second addend bits plus one, and a second carry bit;

a plurality of XOR gates with one XOR gate associated with each segment adder pair to receive the first carry bit from an adjacent lower order segment and the second carry bit from the adjacent lower order segment to produce a carry check bit;

a plurality of OR gates with one OR gate associated each segment adder pair and joined to receive the carry check bit for the segment, said OR gate providing a selector value from the carry check bit for the segment and the selector value from the adjacent lower order segment;

a plurality of multiplexers with one multiplexer provided for each segment adder pair, each multiplexer joined to receive the first sum portion and the second sum portion from said segment adder pair, each said multiplexer being further joined to receive the selector value from the OR gate associated with the segment adder pair, said multiplexer providing the first sum portion as a segment sum portion output when the selector value is not asserted and the second sum portion as the segment sum portion output when the selector value is asserted; and a sum output joined to receive the least significant sum from said least significant adder and the segment sum portion outputs from the plurality of multiplexers to produce the sum of the first addend and the second addend.

* * * * *